UNITED STATES PATENT OFFICE.

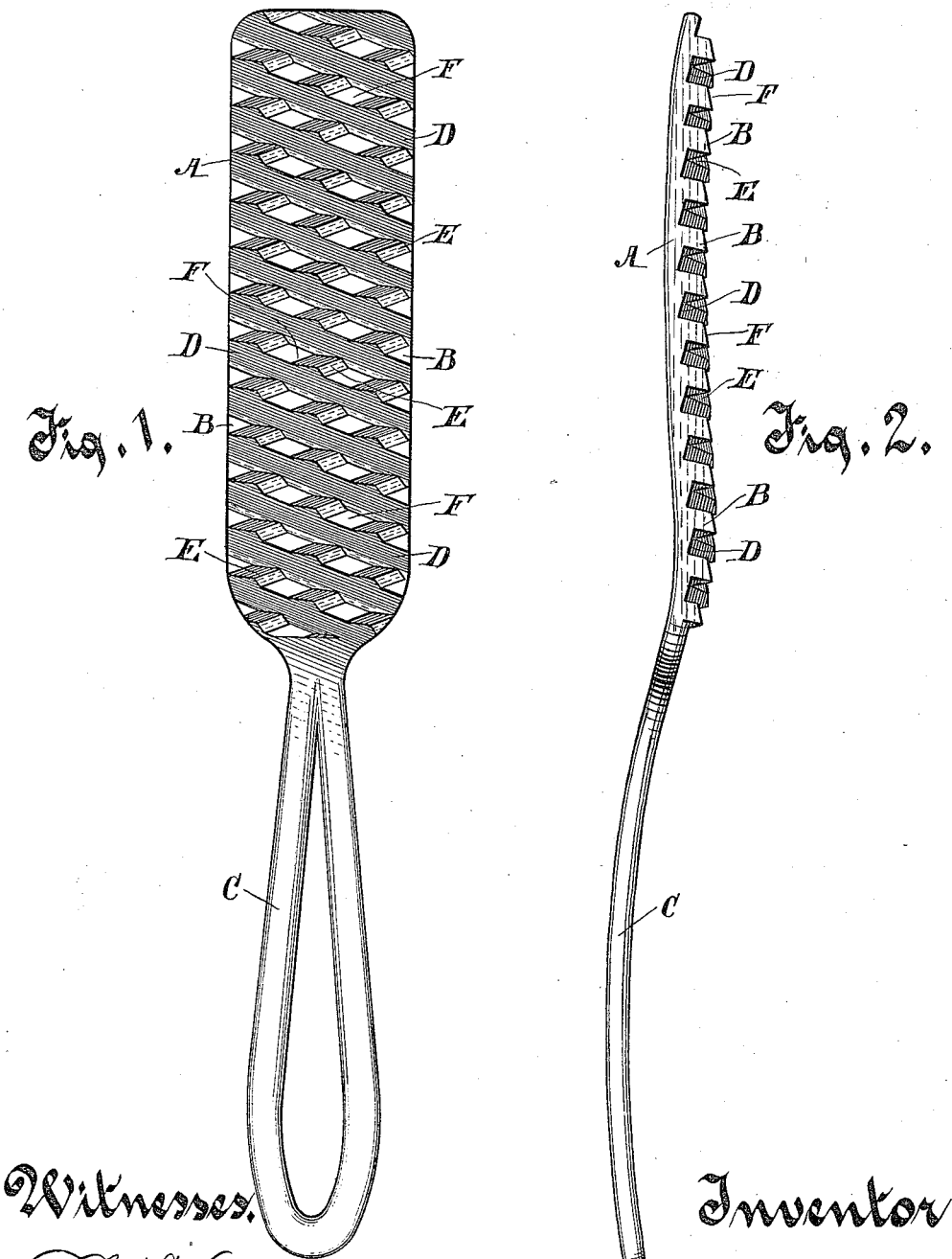

AUGUST WM. KAVEL, OF MILWAUKEE, WISCONSIN.

FISH-SCALER.

SPECIFICATION forming part of Letters Patent No. 441,244, dated November 25, 1890.

Application filed February 8, 1890. Serial No. 339,679. (No model.)

*To all whom it may concern:*

Be it known that I, AUGUST WM. KAVEL, of Milwaukee, in the county of Milwaukee and State of Wisconsin, have invented a new and useful Fish-Scaler; and I do hereby declare the following to be a full, clear, and exact description of said invention, reference being had to the accompanying drawings, and to the letters of reference marked thereon, which form a part of this specification.

The object of my invention is to provide a device adapted for removing the scales from fish by repeatedly drawing the device in one direction against the scales on the fish, the device being so constructed as not to tear or abrade the flesh when moved in either direction over the surface of the fish.

In the drawings, Figure 1 is the complete device, the view showing the face of the ribbed surface. Fig. 2 is an edge view of the device.

The complete device, consisting of a plate A, diagonal ribs B B, and a handle C, is formed integrally of steel or hardened iron. The plate A is curved inwardly slightly longitudinally, and the ribs B B are formed parallel to each other and diagonally across the inner or inwardly-curved face of the plate A. These ribs are formed by cutting channels D D into the surface of the plate, which channels have their walls inclined as they go down into the plate toward the rear or outer end of the plate, thus undercutting the ribs slightly toward the outer end of the plate, whereby the front walls of the ribs are constructed with a slight inclination forwardly or toward the inner or handle end of the device. The channels D D are formed with parallel walls, and the ribs B B are thus constructed with a flat or nearly flat outer surface, which surface is preferably cut across at an acute angle to the channels D D by shallower grooves E E, whereby the surface of the ribs B B is formed into diamond-shaped blocks or teeth F F. These diamond-shaped teeth, by reason of the undercut of the channels D D rearwardly, present a forward sharp edge on one side only of their four sides. This sharp edge is toward the handle of the device, so that the scales of the fish are to be removed by pressing the device firmly against the surface of the fish and drawing the device toward and against the free edge of the scales. It will be observed that the cutting-edge of the teeth is at an oblique angle to the length of the plate A, so that as the device is drawn over the fish endwise the action of the teeth is in an oblique direction against the scales.

What I claim as new, and desire to secure by Letters Patent, is—

A fish-scaler consisting of a metal plate having a handle formed integrally therewith, the plate being slightly curved inwardly longitudinally and having a series of oblique transverse channels cut with inclined walls at equal distances apart in its inner surface, and a series of parallel ribs alternating with the channels, which ribs are grooved at distances apart at an acute angle to their channel-walls, whereby diamond-shaped teeth are formed each having a single forwardly-presented sharp edge and a flat or nearly flat outer surface, substantially as described.

In testimony whereof I affix my signature in presence of two witnesses.

AUGUST WM. KAVEL.

Witnesses:
C. T. BENEDICT,
ANNA FAUST.